(12) United States Patent
Haselhorst et al.

(10) Patent No.: US 9,090,138 B2
(45) Date of Patent: Jul. 28, 2015

(54) SINGLE-SHELL SPRING ARM

(71) Applicant: Gestamp Umformtechnik GmbH, Bielefeld (DE)

(72) Inventors: Kai Haselhorst, Versmold (DE); Ralf Koormann, Leopoldshoehe (DE); Mathias Buchholz, Bielefeld (DE); Ronald Hertl, Bielefeld (DE)

(73) Assignee: Gestamp Umformtechnik GmbH, Bielefeld (DE)

( * ) Notice: Subject to any disclaimer, the term of this patent is extended or adjusted under 35 U.S.C. 154(b) by 0 days.

(21) Appl. No.: 14/375,329

(22) PCT Filed: Jan. 23, 2013

(86) PCT No.: PCT/EP2013/051192
§ 371 (c)(1),
(2) Date: Jul. 29, 2014

(87) PCT Pub. No.: WO2013/113591
PCT Pub. Date: Aug. 8, 2013

(65) Prior Publication Data
US 2015/0008654 A1 Jan. 8, 2015

(30) Foreign Application Priority Data
Jan. 30, 2012 (DE) .......................... 10 2012 100 719

(51) Int. Cl.
*B60G 7/00* (2006.01)
*B60G 11/16* (2006.01)
*B21D 53/88* (2006.01)

(52) U.S. Cl.
CPC ................ *B60G 7/001* (2013.01); *B60G 11/16* (2013.01); *B21D 53/88* (2013.01); *B60G 2204/1244* (2013.01); *B60G 2206/017* (2013.01);

(Continued)

(58) Field of Classification Search
USPC .................... 280/124.108, 124.116, 124.128, 280/124.134, 124.153
IPC ........ B60G 7/001,11/16, 2206/8103, 2206/017, B60G 2206/16
See application file for complete search history.

(56) References Cited

U.S. PATENT DOCUMENTS 4,537,420 A * 8/1985 Ito et al. ...................... 280/86.75
7,261,307 B2 * 8/2007 Nuno et al. ............ 280/124.151

(Continued)

FOREIGN PATENT DOCUMENTS

DE 69705144 T2 10/2001
DE 69615889 T2 6/2002

(Continued)

*Primary Examiner* — Faye M Fleming
(74) *Attorney, Agent, or Firm* — The Webb Law Firm

(57) ABSTRACT

The invention relates to a single-shell spring control arm, for a wheel suspension of a motor vehicle, comprising a first end portion for attaching to a chassis beam a second end portion for attaching on the wheel side, and an increased-width portion which is arranged between the two end portions, and which comprises a spine having flanks projecting therefrom and which defines a spring seat for supporting a spring. In order to attain high component rigidity and a wheel suspension which is optimized with regard to loads, the invention proposes that inwardly deformed surface parts are formed on the flanks, the longitudinal edges of which surface parts are spaced apart from one another along their entire length so that the increased-width portion has a C-profile-shaped cross-sectional profile, and in that a connection portion for attaching a shock absorber is formed between the spring seat and the second end portion.

17 Claims, 5 Drawing Sheets

(52) U.S. Cl.
CPC ....... *B60G2206/141* (2013.01); *B60G 2206/16* (2013.01); *B60G 2206/722* (2013.01); *B60G 2206/8102* (2013.01); *B60G 2206/8103* (2013.01)

(56) References Cited

U.S. PATENT DOCUMENTS

| | | | |
|---|---|---|---|
| 2006/0175788 | A1 | 8/2006 | Nuno et al. |
| 2014/0300074 | A1* | 10/2014 | Koormann et al. .... 280/124.151 |

FOREIGN PATENT DOCUMENTS

| | | | | |
|---|---|---|---|---|
| DE | 10241406 | A1 | 12/2003 | |
| DE | 102004008957 | A1 * | 9/2005 | ............... B60G 7/00 |
| DE | 102004039175 | A1 | 2/2006 | |
| DE | 102006014730 | A1 | 10/2007 | |
| DE | 102006032595 | A1 * | 1/2008 | ............... B60G 7/00 |
| DE | 102008013182 | A1 | 9/2009 | |
| DE | 102011000462 | A1 | 8/2012 | |
| EP | 1223058 | A2 | 7/2002 | |
| EP | 1642754 | A1 | 4/2006 | |
| JP | 2002316228 | A * | 10/2002 | ............... B60G 7/00 |
| JP | 2010195317 | A | 9/2010 | |
| JP | 2010241259 | A | 10/2010 | |
| WO | 2010004414 | A2 | 1/2010 | |

* cited by examiner

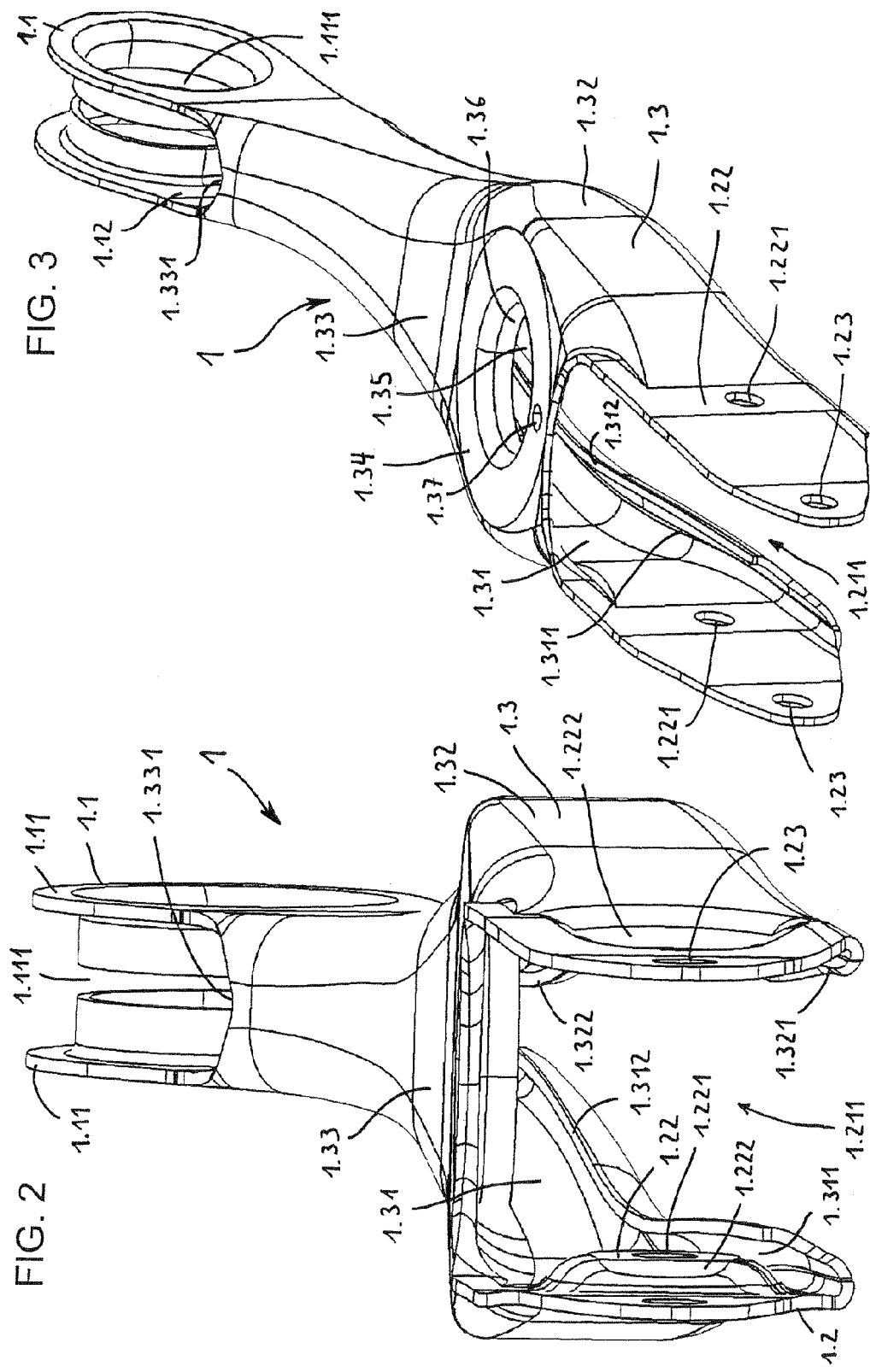

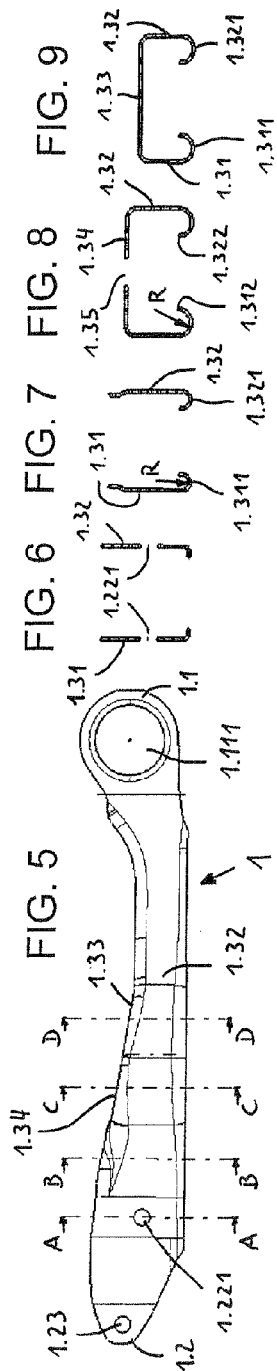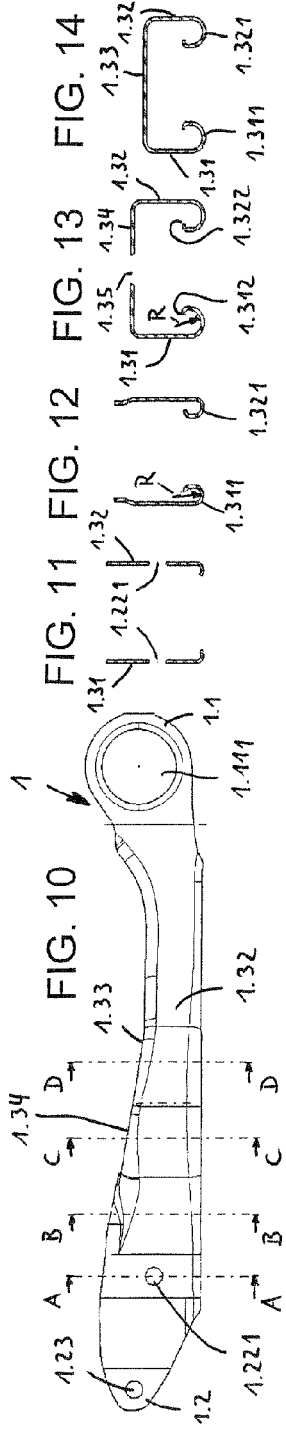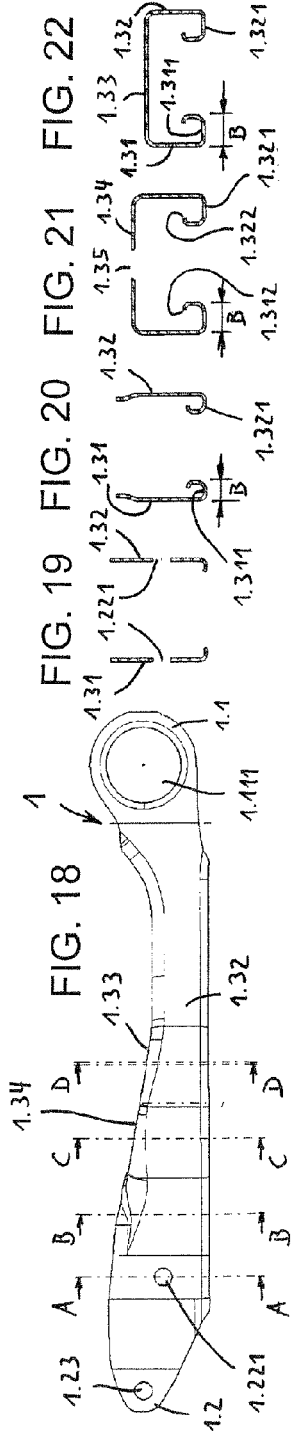

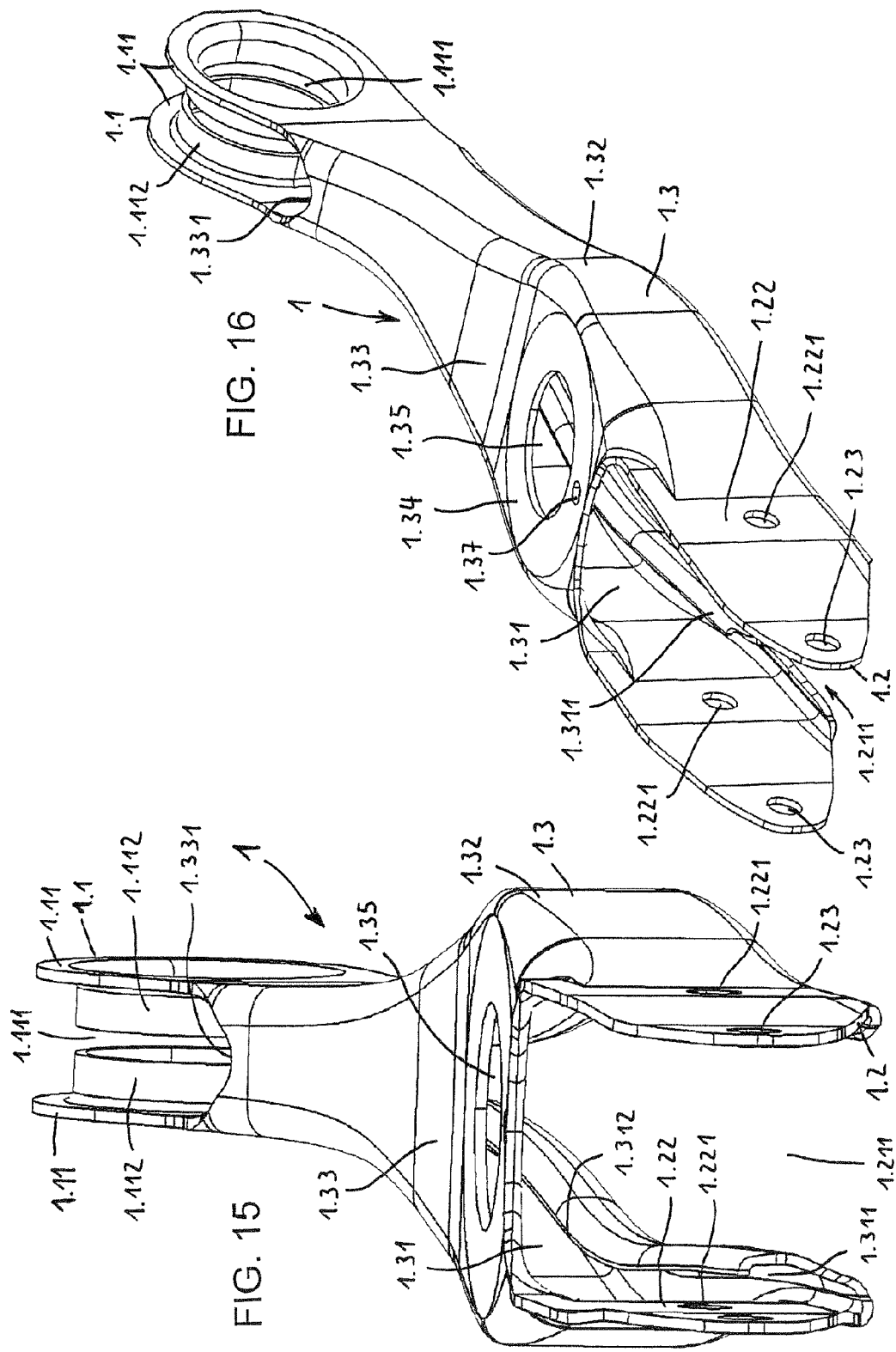

SINGLE-SHELL SPRING ARM

CROSS-REFERENCE TO RELATED APPLICATIONS

This application is the U.S. national phase of International Application No. PCT/EP2013/051192 filed Jan. 23, 2013, and claims priority to German Patent Application No. 10 2012 100 719.5 filed Jan. 30, 2012, the disclosures of which are hereby incorporated in their entirety by reference.

BACKGROUND OF THE INVENTION

1. Field of the Invention

The invention relates to a single-shell spring control arm, formed from sheet steel, for a wheel suspension of a motor vehicle, comprising a first end portion for attaching to a chassis beam, preferably a rear axle beam, a second end portion for attaching on the wheel side, and an increased-width portion which is arranged between the two end portions, and which comprises a spine having flanks projecting therefrom and which defines a spring seat for supporting a spring.

Spring control arms are used to guide a chassis wheel on a wheel suspension of a motor vehicle. They comprise a portion for supporting a spring or a spring/shock absorber arrangement, which in turn is supported against the vehicle bodywork.

Spring control arms are often subject to high alternating loads during driving. If the spring control arm is not sufficiently rigid, a widening or deformation of the spring control arm can occur in particular in the region of the spring support. In order to achieve a high load-bearing capacity in the region of the spring support, current known spring control arms are provided with one or more reinforcing auxiliary plates. For example cup-shaped shells are inserted into the increased-width portion of the spring control arm in the region of the spring support as reinforcing auxiliary plates. Furthermore, multi-shell spring control arms are known, which comprise, in the region of the spring pad, a closure plate which encloses the spring and is welded to the two flanks of a channel-shaped spring control arm shell.

2. Description of Related Art

DE 10 2004 008 957 A1 discloses a spring control arm for a wheel suspension that is formed from a spring control arm shell having a substantially U-shaped profile, the U-shaped profile comprising on its open side two crescent-shaped bridge plates which are arranged on both sides of the spring pad surface and are fastened to the spring control arm shell by rivets, screws or welded connections.

The production and incorporation of the additional shells or closure plates and bridging plates necessitates appropriate production steps, and this has an unfavourable effect on production costs. In addition, known multi-shell spring control arms sometimes have a relatively high component weight as a result of their reinforcing auxiliary plates.

DE 10 2006 032 595 A1 discloses a single-shell spring control arm, the integrally formed spring control arm shell of which comprises a first end portion for attaching on the vehicle-body side, a second end portion for attaching on the wheel side and an increased-width portion for supporting a spring. The portion having the increased width has a U-shaped profile, the free ends of which are each bent outwards to form a collar (flange). The portion having the increased width further comprises an annular surface, which has been folded outwards, as the spring seat. To improve the centring of the spring, an inwards facing protuberance is formed inside the annular surface and is provided with a central opening. This known single-shell spring control arm has a lower component weight than the known multi-shell spring control arms. Manufacturing steps, which are required with multi-shell spring control arms for the production and incorporation of the additional closure and bridging plates, are omitted during the production of the single-shell spring control arms.

SUMMARY OF THE INVENTION

The problem addressed by the present invention is to provide a spring control arm of the type mentioned at the outset, which allows for optimised wheel suspension by distributing the forces and moments to spatially separate connection or linking points while having a relatively low component weight and favourable production costs, and also in particular offers improved suspension properties.

The single-shell spring control arm according to the invention is characterised in that inwardly deformed surface parts are formed on the flanks of the portion of said spring control arm having the increased width, the longitudinal edges of which surface parts are spaced apart from one another over the entire length such that the increased-width portion has a C-profile-shaped cross-sectional profile, and in that a connection portion for attaching a shock absorber is formed between the spring seat and the second end portion. In this case, the spring seat is preferably located on the outside of the spine of the spring control arm.

Owing to the inwardly deformed surface parts of the flanks, higher component rigidity and strength is achieved by comparison with single-shell spring control arms having outwardly curved collars (flanges) while using the same amount of material. This allows savings to be made in terms of material while the load demands on the spring control arm remain the same. Investigations carried out by the applicant have shown that the amount of material used to produce a spring control arm according to the invention can be reduced by approximately 10% with respect to the material used to produce a conventional single-shell spring control arm having outwardly bent flanges (collars). The reduction in the amount of material leads to a weight reduction in a vehicle equipped with the spring control arm according to the invention and thus to a reduction in fuel consumption. In addition, the reduction in the amount of material also brings about a reduction in material costs. The connection portion which is formed on the spring control arm so as to be spatially separate from the seat and is intended for attaching a shock absorber allows forces and moments to be distributed in a more uniform manner to the spring control arm and to the associated vehicle body, the result of which is an overall improved wheel suspension. This distribution of the forces and moments to the spring control arm likewise allows for a reduction in the amount of material. Furthermore, the inwardly deformed surface parts of the flanks of the spring control arm according to the invention produce compact dimensions which lead to lower space requirements.

In an advantageous embodiment of the spring control arm according to the invention, the inwardly deformed surface parts of the flanks point towards the spine over at least a portion of their length. This embodiment gives the spring control arm a relatively high rigidity and strength while having a relatively low component weight and compact component dimensions. Corresponding profiling of the deformed surface parts of the flanks reduces the stresses on the sheared edges of the deformed surface parts of the flanks. In particular, this embodiment allows the weight of the control arm to be reduced further.

Another advantageous embodiment of the spring control arm according to the invention is characterised in that the inwardly deformed surface parts of the flanks point towards the inner sides of the flanks over at least a portion of their length. This embodiment also gives the spring control arm a relatively high rigidity and strength while having a low component weight and compact component dimensions. Corresponding profiling of the deformed surface parts of the flanks reduces the stresses on sheared edges of the deformed surface parts of the flanks. In particular, this embodiment allows the weight of the control arm to be reduced further.

According to another preferred embodiment of the spring control arm according to the invention, the inwardly deformed surface parts of the flanks comprise an arcuate profile shape over at least a portion of their length, the radius of said profile shape varying in the longitudinal direction of the spring control arm. In this embodiment in particular, the spring control arm according the invention is characterised by a relatively high rigidity and strength while having a low component weight and compact component dimensions.

Another advantageous embodiment of the spring control arm according to the invention is characterised in that the inwardly deformed surface parts of the flanks have a J-shaped or angular-profile-shaped profile shape over at least a portion of their length, the width of said profile shape varying in the longitudinal direction of the spring control arm. In this embodiment too, the spring control arm according to the invention is characterised by relatively high rigidity and strength while having a low component weight and compact component dimensions. In this case, the respective flank preferably encloses an angle in the range of from 80° to 100°, preferably in the range of from 85° to 95°, with the associated inwardly deformed surface part.

Another advantageous embodiment of the spring control arm according to the invention is characterised in that the inwardly deformed surface part of one flank differs in terms of its profile shape from the profile shape of the inwardly deformed surface part of the other flank. In this case, an individual profile shape is present for each flank or inwardly deformed surface part. The embodiment allows optimum levels of component rigidity and strength with particularly low component weight and compact component dimensions.

According to another preferred embodiment of the spring control arm, it is also particularly favourable in production terms if the spring seat transitions into the region of the spring control arm spine that surrounds it in a substantially step-free manner.

Another advantageous embodiment of the spring control arm according to the invention provides that the connection portion for attaching a shock absorber comprises mutually aligned openings which are arranged within opposing inwardly formed indentations. The inwardly formed indentations also improve the rigidity and strength of the spring control arm.

Another advantageous embodiment of the spring control arm according to the invention is characterised in that the flanks of the increased-width portion extend continuously up to the second end portion and define a fork-shaped bearing portion for attaching a wheel carrier and for attaching the shock absorber, the fork-shaped bearing portion delimiting a recess-shaped cut-out which extends from the second end portion at least up to the connection portion that is used to attach the shock absorber. By attaching the shock absorber to the flanks of the channel-shaped spring control arm shell, the rigidity of the spring control arm is improved further. The cut-out provided in the fork-shaped bearing portion, which extends at least up to the connection portion that is used to attach the shock absorber, reduces the component weight of the spring control arm.

It is also advantageous for the rigidity of the spring control arm if, according to another preferred embodiment, a U-shaped, outwardly bent collar is formed on the recess-shaped cut-out of the second end portion. When the spring control arm is assembled, the collar projects upwards counter to the flanks of the spring control arm.

Another advantageous embodiment of the spring control arm according to the invention provides that, starting from a point located either between the bearing portion for attaching a wheel carrier and the connection portion for attaching a shock absorber or in the region of the connection portion for attaching the shock absorber, the inwardly formed flanges extend continuously up to the end of the spring control arm spine, which abuts the first end portion of the spring control arm. This can achieve particularly high strength and rigidity of the spring control arm while having a component weight that is as low as possible.

According to another advantageous embodiment of the spring control arm according to the invention, it is provided that the flanks of the increased-width portion extend continuously up to the first end portion of the spring control arm and define a fork-shaped bearing portion for attaching the spring control arm to a chassis beam, the fork-shaped bearing portion comprising mutually aligned openings having collars for receiving a bearing bushing and delimiting a recess-shaped cut-out, which extends towards the spring seat at a depth which is greater than the outer diameter of the respective collar that is used to receive the bearing bushing. Said collars, which can also be designated as flanged rim holes, are preferably directed inwards, i.e. face each other. The relatively deep recess-shaped cut-out in the direction of the spring seat in turn reduces the component weight of the spring control arm.

According to another advantageous embodiment, the spring control arm according to the invention is produced from sheet steel having a yield strength of at least 600 MPa, preferably at least 650 MPa. According to another preferred embodiment, it is also favourable for high component rigidity with a low component weight if the spring control arm according to the invention is produced from sheet steel having a tensile strength of at least 700 MPa, preferably at least 800 MPa. In particular, it is provided to produce the spring control arm from high-strength complex phase steel.

BRIEF DESCRPTION OF THE DRAWINGS

The invention will be described in greater detail below with reference to drawings showing several embodiments, in which drawings:

FIG. 2 is a perspective view of another spring control arm according to the invention, in this case not having a spring, a shock absorber or a bearing bushing;

FIGS. 3 and 4 are a perspective view and a view from below, respectively, of another spring control arm according to the invention (without a spring, a shock absorber and a bearing bushing);

FIG. 5 is a side view of the spring control arm of FIGS. 3 and 4;

FIG. 6 to 9 are sectional views of the spring control arm along the sectional lines A-A, B-B, C-C and D-D in FIG. 5;

FIG. 10 is a side view of another spring control arm according to the invention;

FIG. 11 to 14 are sectional views of the spring control arm along the section lines A-A, B-B, C-C and D-D in FIG. 10;

FIG. 15 to 17 are perspective views and a view from below, respectively, of another spring control arm according to the invention (without a spring, a shock absorber and a bearing bushing);

FIG. 18 is a side view of the spring control arm of FIG. 15 to 17; and

FIG. 19 to 22 are sectional views of the spring control arm along the sectional lines A-A, B-B, C-C and D-D in FIG. 18.

DESCRIPTION OF THE INVENTION

Figure 1:
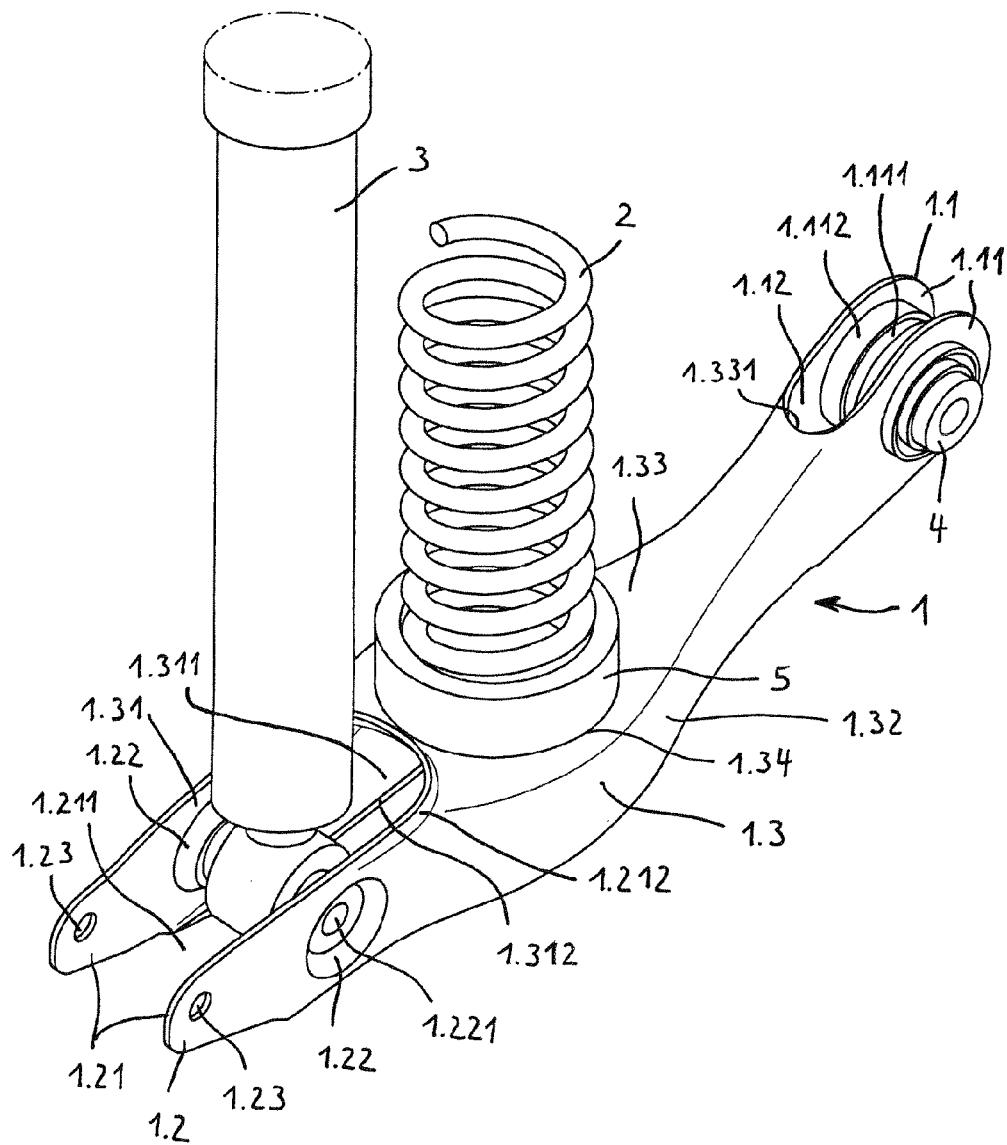
FIG. 1 is a perspective view of a spring control arm according to the invention having a spring supported thereon, a shock absorber which is spatially separate therefrom and attached thereto, and a bearing bushing.

The drawings show various embodiments of a spring control arm 1 for a wheel suspension of a motor vehicle. The respective spring control arm 1 is produced as a single-shell component by forming from a metal blank and comprises a first end portion 1.1 for attaching to a chassis beam, preferably a rear axle beam, and a second end portion 1.2 for attaching to a wheel carrier. A portion 1.3 having an increased width for supporting a spring (helical spring) 2 is formed between the two end portions 1.1, 1.2 (cf. FIG. 1).

The spring control arm 1 preferably consists of high-strength sheet steel. The metal or sheet steel used in the production thereof has for example a yield strength of at least 650 MPa and tensile strength of at least 800 MPa.

The increased-width portion 1.3 of the spring control arm 1 that carries the helical spring 2 is formed to be substantially channel-shaped. The flanks 1.31, 1.32 of the channel project downwards with respect to their central web (spine) 1.33. The spring seat 1.34 or the receptacle for a spring base is located on the outside of the central web (spine) 1.33. The spring seat 1.34 transitions into the region of the spring control arm spine that surrounds it in a substantially step-free manner. An opening 1.35 is cut out inside the spring seat 1.34, on which opening preferably an inwardly or downwardly projecting collar 1.36 can be formed as a flanged rim hole (cf. FIGS. 3 and 4). Within the context of the invention, however, the spring seat 1.34 can be formed as an inwardly formed annular indentation (not shown) and/or the flanged rim hole 1.36 can be formed as an outwardly projecting collar (not shown).

The flanks 1.31, 1.32 of the portion 1.3 having the increased width extend continuously up to the end portion 1.2 on the wheel-carrier side and define a fork-shaped bearing portion 1.21 for attaching a wheel carrier.

In addition, the spring control arm 1 comprises a connection portion 1.22 for attaching a shock absorber 3 (cf. FIG. 1). Said connection portion 1.22 is formed between the spring seat 1.34 and the wheel-carrier-side end portion 1.2 of the spring control arm so as to be spatially separate. The portion 1.22 for attaching the shock absorber is also placed at the fork-shaped bearing portion 1.21 used to attach the wheel carrier and comprises mutually aligned openings 1.221. The openings 1.221 are preferably arranged within opposing indentations 1.222 (cf. FIGS. 2 and 3). The indentations 1.222 are inwardly shaped and formed for example in the form of a dome.

The fork-shaped bearing portion 1.21 delimits a recess-shaped cut-out 1.211 which begins between the spring seat 1.34 and the connection portion 1.22 for attaching the shock absorber and terminates at the end portion 1.2 on the wheel-carrier side. At the edge of the recess-shaped cut-out 1.211 of the control arm ridge 1.33, an outwardly bent collar 1.212 is formed which is U-shaped in a similar manner to the recess-shaped cut-out 1.211. The collar 1.212 projects upwards facing away from the spine 1.33. The collar 1.212 increases the strength of the spring control arm while having minimal component weight.

It can further be seen that the flanks 1.31, 1.32 of the increased-width portion 1.33 of the spring control arm also extends continuously up to the end portion 1.1, by means of which the spring control arm 1 is coupled to a rear axle beam or another chassis beam. Here, the flanks 1.31, 1.32 in turn define a fork-shaped bearing portion 1.11 which comprises mutually aligned openings 1.111 having collars 1.112 for receiving a bearing bushing 4, preferably a rubber-metal bearing (see FIG. 1). The collars 1.112 are produced as flanged rim holes of the openings 1.111 and are preferably directed inwards, i.e. face one another. These flanged rim holes (collars) 1.112 can, however, also be directed outwards.

The end portion 1.1 which is associated with a rear axle beam, of the spring control arm 1 also comprises a recess-shaped cut-out 1.12 which terminates towards the end, which is located here, of the spring control arm 1. The cut-out 1.12 of the spring control arm spine 1.33 extends from the end of the spring control arm 1 towards the spring seat 1.34 at a depth that is preferably greater than the diameter of the opening 1.111 used to receive the bearing bushing.

The flanks 1.31, 1.32 of the single-shell, channel-shaped spring control arm 1 are bent inwards in the lower profile region, so that inwardly deformed surface parts 1.311, 1.321 are formed here. The inwardly bent surface parts 1.311, 1.321 each extend continuously between the two end portions 1.1, 1.2, the longitudinal edges (sheared edges) 1.312, 1.322 of the surface parts 1.311, 1.321 being spaced apart from one another over their entire length (see in particular FIGS. 4 and 17). Closure or bridge plates, which interconnect the flanks or flanges (as with known spring control arms), are not provided in the single-shell spring control arm 1 according to the invention.

The inwardly formed surface parts 1.311, 1.321 of the spring control arm 1 according to the invention extend continuously up to the end 1.331 of the spring control arm spine 1.33 which abuts the first end portion 1.1 of the spring control arm 1, starting from a point between the bearing portion 1.21 for attaching a wheel carrier and the portion 1.22 for attaching a shock absorber. The width of the inwardly formed surface parts changes over the length thereof. The surface parts 1.311, 1.321 are preferably widest in the region of the spring seat 1.34.

The inwardly formed surface parts 1.311, 1.321 can be formed substantially in the form of flanges. Preferably, however, the inwardly formed surface parts 1.311, 1.321 of the flanks 1.31, 1.32 are formed such that they point towards the spine 1.33 and/or towards the inner sides of the flanks 1.31, 1.32 over at least a portion of their length (cf. FIG. 2 to 22). As a result, the portion 1.3 of the spring control arm that has the increased width comprises a substantially C-profile-shaped cross-sectional profile, in particular in the region of the spring seat 1.34 or of the spine 1.33.

In the embodiments shown in FIGS. 2 and 3 to 9, the inwardly formed surface parts 1.311, 1.321 of the flanks 1.31, 1.32 are substantially arcuate. They have an arcuate profile shape over at least a portion of their length, the radius R of said profile shape varying in the longitudinal direction of the spring control arm 1. In this case, however, the sheared edges (longitudinal edges) 1.312, 1.322 of the inwardly deformed surface parts 1.311, 1.321 point towards the spring control arm spine 1.33.

In the embodiment shown in FIG. 10 to 14, the inwardly formed surface parts 1.311, 1.321 of the flanks 1.31, 1.32 are likewise substantially arcuate. They also have an arcuate profile shape over a portion of their length, the radius R of said profile shape varying in the longitudinal direction of the spring control arm 1. In this embodiment, however, the sheared edges (longitudinal edges) 1.312, 1.322 of the inwardly formed surface parts 1.311, 1.321 point towards the inner sides of the flanks 1.31, 1.32.

In the embodiment shown in FIG. 18 to 22 also, the inwardly deformed surface parts 1.311, 1.321 of the flanks 1.31, 1.32 are additionally deformed or rolled up towards the inner sides of the flanks 1.31, 1.32. The surface parts 1.311, 1.321 have a J-shaped or angle-profile-shaped profile shape over at least a portion of their length, the width B of said profile shape varying in the longitudinal direction of the spring control arm. In this case, the respective surface part 1.311, 1.321 encloses an angle in the range of from 85° to 95° with the associated flank 1.31, 1.32. This angle is preferably approximately 90°.

Figure 4:
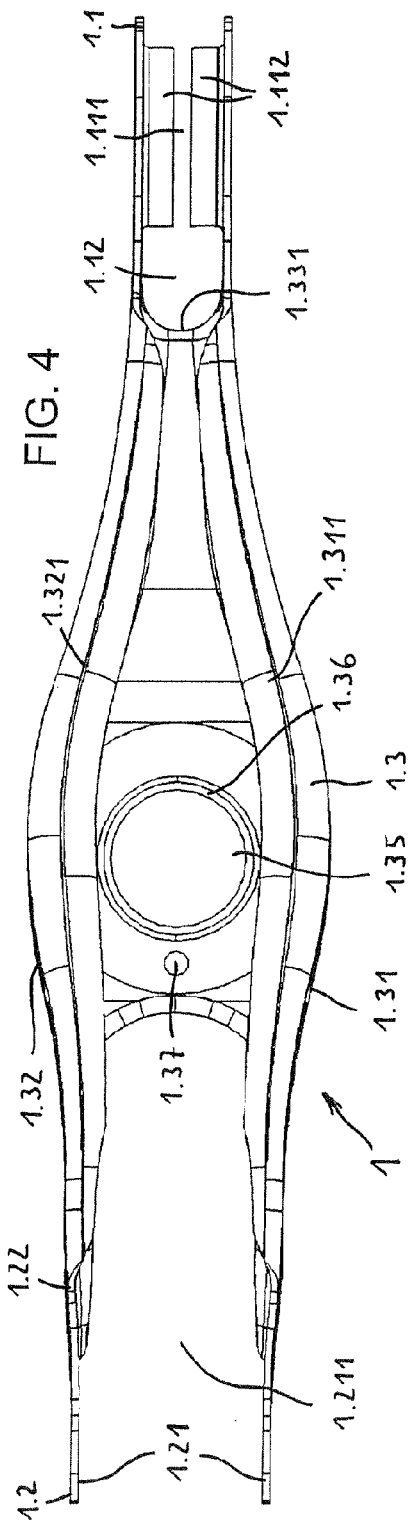
Figure 17:
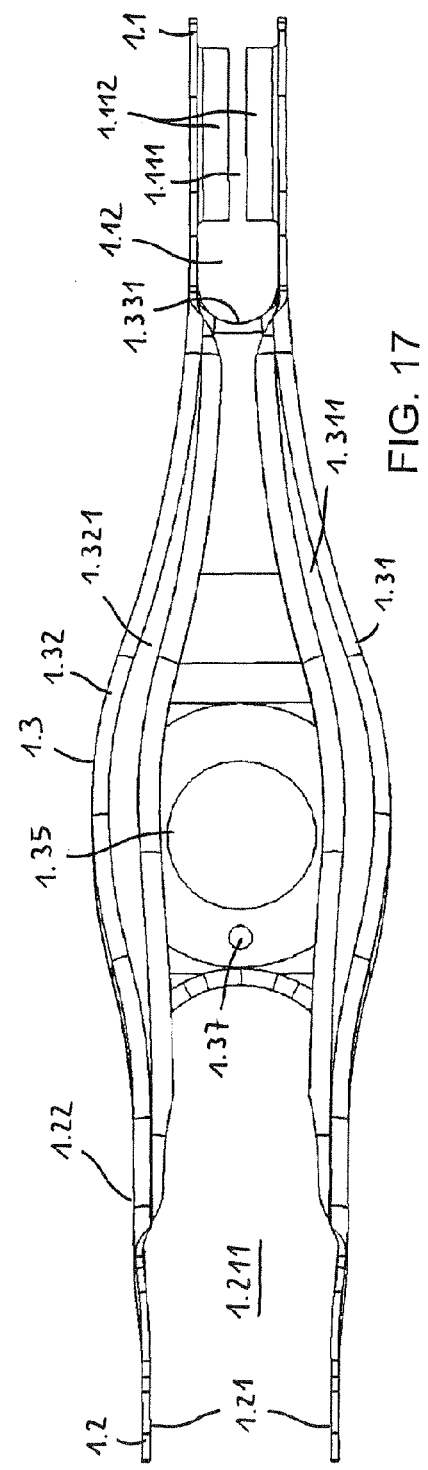

As is particularly clear in FIGS. 4 and 17, the spacing of the longitudinal edges 1.312, 1.322 of the inwardly formed surface parts 1.311, 1.321 in the region of the spring seat 1.34 is greater than or equal to the diameter of the opening 1.35 or the outer diameter of the collar 1.36 projecting inwards at the opening 1.35.

An opening 1.37 is cut out in the central web (spine) 1.33 of the spring control arm shell 1 in the region of the spring seat 1.34, which opening is used to fix and align a spring base 5 produced from rubber or plastics material (cf. FIG. 1). The spring base 5 optimises the support of the helical spring 2 supported on the spring control arm 1.

The spring control arm spine 1.33 is formed so as to be arcuate between the end portion 1.1 on the vehicle-body side and the spring seat 1.34, such that the outside of the spine 1.33 has a concave curvature, at this point, relative to the longitudinal extension of the spring control arm 1 (cf. FIGS. 5, 10 and 18). In this case, the height of the lateral flanks 1.31, 1.32 of the C-shaped profile initially reduces gradually starting from the spring seat 1.34 towards the vehicle-body-side end portion 1.1 of the spring control arm 1, reaches its minimum between the spring seat 1.34 and the end portion 1.1 or the recess-shaped cut-out 1.12, and then gradually increases again towards the end portion 1.1 or the recess-shaped cut-out 1.12 (cf. in particular FIGS. 5, 8, 9; 10, 13, 14; 18, 21 and 22).

The spring control arm 1 according to the invention is characterised by a low component weight and favourable production costs and offers optimised wheel suspension owing to the forces and moments being distributed to spatially separate attachment or coupling points. Said spring control arm is particularly suitable for a multi-arm rear axle.

The design of the spring control arm according to the invention is not limited to the embodiments shown in the drawings. Instead, many variants are conceivable which make use of the invention as stated in the claims even if they are carried out in a manner that deviates from the embodiments shown. For example, the aligned openings 1.23 for attachment on the wheel-carrier side can also be formed as flanged rim holes having inwardly or outwardly projecting collars. In particular, within the context of the present invention it is possible to combine features of the various embodiments of the spring control arm according to the invention.

The invention claimed is:

1. A single-shell spring control arm, formed from sheet steel, for a wheel suspension of a motor vehicle, comprising a first end portion for attaching to a chassis beam, a second end portion for attaching on the wheel-side and an increased-width portion which is arranged between the two end portions, and which comprises a spine having flanks projecting therefrom and which defines a spring seat for supporting a spring, wherein inwardly deformed surface parts are formed on the flanks, the longitudinal edges of which surface parts are spaced apart from one another along their entire length so that the increased-width portion has a C-profile-shaped cross-sectional profile, and in that a connection portion for attaching a shock absorber is formed between the spring seat and the second end portion.

2. The spring control arm according to claim 1, wherein the inwardly deformed surface parts of the flanks point towards the spine over at least a portion of their length.

3. The spring control arm according to claim 1, wherein the inwardly deformed surface parts of the flanks point towards the inner sides of the flanks over at least a portion of their length.

4. The spring control arm according to claim 1, wherein the inwardly deformed surface parts of the flanks have an arcuate profile shape over at least a portion of their length, the radius of said profile shape varying in the longitudinal direction of the spring control arm.

5. The spring control arm according to claim 1, wherein the inwardly deformed surface parts of the flanks have a J-shaped or angle-profile shaped profile shape over at least a portion of their length, the width of said profile shape varying in the longitudinal direction of the spring control arm.

6. The spring control arm according to claim 5, wherein the respective flank encloses an angle in the range of from 80° to 100° with the associated inwardly deformed surface part.

7. The spring control arm according to claim 1, wherein the inwardly deformed surface part of one flank differs in terms of its profile shape from the profile shape of the other inwardly deformed surface part of the other flank.

8. The spring control arm according to claim 1, wherein the connection portion for attaching a shock absorber comprises mutually aligned openings which are arranged within opposing, inwardly shaped indentations.

9. The spring control arm according to claim 1, wherein the flanks of the increased-width portion extend continuously up to the second end portion and define a fork-shaped bearing portion for attaching a wheel carrier and for attaching the shock absorber, the fork-shaped bearing portion delimiting a recess-shaped cut-out which extends from the second end portion at least up to the connection portion that is used to attach the shock absorber.

10. The spring control arm according to claim 9, wherein a U-shaped, outwardly bent collar is formed on the recess-shaped cut-out.

11. The spring control arm according to claim 1, wherein the inwardly deformed surface parts extend continuously up to the end of the spring control arm spine, which abuts the first end portion of the spring control arm, starting from a point that is either between a bearing portion for attaching a wheel carrier and the connection portion for attaching a shock absorber or in the region of the connection portion for attaching the shock absorber.

12. The spring control arm according to claim 1, wherein the flanks of the increased-width portion extend continuously up to the first end portion and define a fork-shaped bearing portion for attaching the spring control arm to a chassis beam, the fork-shaped bearing portion comprising mutually aligned openings having collars for receiving a bearing bushing, and delimiting a recess-shaped cut-out which extends towards the spring seat at a depth that is greater than the outer diameter of the respective collar that is used to receive the bearing bushing.

13. The spring control arm according to claim 1, wherein said spring control arm is produced from sheet steel having a yield strength of at least 600 MPa.

14. The spring control arm according to claim 1, wherein said spring control arm is produced from sheet steel having a tensile strength of at least 700 MPa.

15. The spring control arm according to claim 1, wherein the chassis beam is a rear axle beam.

16. The spring control arm according to claim 1, wherein said spring control aim is produced from sheet steel having a yield strength of at least 650 MPa.

17. The spring control arm according to claim 1, wherein said spring control arm is produced from sheet steel having a tensile strength of at least 800 MPa.

* * * * *

UNITED STATES PATENT AND TRADEMARK OFFICE
CERTIFICATE OF CORRECTION

PATENT NO. : 9,090,138 B2  
APPLICATION NO. : 14/375329  
DATED : July 28, 2015  
INVENTOR(S) : Haselhorst et al.

Page 1 of 1

It is certified that error appears in the above-identified patent and that said Letters Patent is hereby corrected as shown below:

In the claims  
Column 9, Line 10, claim 16 delete "aim" and insert -- arm --

Signed and Sealed this  
Second Day of February, 2016

Michelle K. Lee  
*Director of the United States Patent and Trademark Office*